US011846933B2

(12) United States Patent
Uzunbas et al.

(10) Patent No.: US 11,846,933 B2
(45) Date of Patent: Dec. 19, 2023

(54) APPARATUS, SYSTEM AND METHOD FOR DEVELOPING INDUSTRIAL PROCESS SOLUTIONS USING ARTIFICIAL INTELLIGENCE

(71) Applicant: General Electric Company, Schenectady, NY (US)

(72) Inventors: Mustafa Gokhan Uzunbas, Niskayuna, NY (US); Ser Nam Lim, Hopkinton, MA (US); Ashish Jain, Bridgewater, NJ (US); Vladimir Shapiro, Newton, MA (US); Weiwei Qian, Niskayuna, NY (US); Mohamad Bagheri Esfe, Medford, MA (US)

(73) Assignee: General Electric Company, Schenectady, NY (US)

( * ) Notice: Subject to any disclaimer, the term of this patent is extended or adjusted under 35 U.S.C. 154(b) by 1193 days.

(21) Appl. No.: 16/245,404

(22) Filed: Jan. 11, 2019

(65) Prior Publication Data
US 2022/0374003 A1    Nov. 24, 2022

(51) Int. Cl.
G05B 19/418    (2006.01)

(52) U.S. Cl.
CPC .... *G05B 19/41875* (2013.01); *G05B 19/4183* (2013.01); *G05B 19/41885* (2013.01)

(58) Field of Classification Search
CPC .......... G05B 19/41875; G05B 19/4183; G05B 19/41885
See application file for complete search history.

(56) References Cited

U.S. PATENT DOCUMENTS

| 8,891,852 B2 * | 11/2014 | Eames ................. G06V 20/00 |
| | | 382/184 |
| 10,636,007 B2 * | 4/2020 | Runkana ................ G06F 17/18 |

(Continued)

FOREIGN PATENT DOCUMENTS

| EP | 3026510 A1 | 6/2016 |
| KR | 10-2018-0137824 A | 12/2018 |

OTHER PUBLICATIONS

Waseem, Faraz; Menon, Sanjit; Xu, Haotian; Mondal, Debashis, "VizInspect Pro—Automated Optical Inspection (AOI) solution", May 26, 2022, arXiv, https://doi.org/10.48550/arXiv.2205.13095 (Year: 2022).*

(Continued)

*Primary Examiner* — Thomas C Lee
*Assistant Examiner* — Tyler Dean Hedrick
(74) *Attorney, Agent, or Firm* — MINTZ LEVIN COHN FERRIS GLOVSKY AND POPEO, PC

(57) ABSTRACT

An apparatus, system and method of providing industrial analytics. The apparatus, system and method include at least a plurality of sensors sensing performance indicators for an industrial process across multiple nodes, wherein ones of the multiple nodes are remote from each other; at least one machine learning module comprising non-transitory computing code executed by a processor. When executed by the processor, the code causes the steps of: receiving user input regarding at least the industrial process and a data set; selecting a model based on at least the user input, wherein the selected model comprises a plurality of learnings based on the performance indicators sensed by multiple sensors across at least multiple ones of the multiple nodes; applying the selected model to the data set; assessing at least the performance indicators for the data set upon application of (Continued)

the selected model; and outputting the assessed performance indicator.

20 Claims, 7 Drawing Sheets

(56) References Cited

U.S. PATENT DOCUMENTS

| | | | | |
|---|---|---|---|---|
| 2007/0005266 | A1* | 1/2007 | Blevins | H04L 67/56 |
| | | | | 702/22 |
| 2010/0082125 | A1 | 4/2010 | Pingel et al. | |
| 2011/0255081 | A1* | 10/2011 | De Greeve | G01N 21/8901 |
| | | | | 356/237.2 |
| 2015/0262095 | A1* | 9/2015 | Rajasekaran | G06Q 10/0637 |
| | | | | 705/7.28 |
| 2016/0350671 | A1 | 12/2016 | Morris, II et al. | |
| 2018/0205803 | A1* | 7/2018 | Asenjo | G06Q 30/0201 |
| 2019/0005588 | A1 | 1/2019 | Carver et al. | |
| 2019/0012904 | A1 | 1/2019 | Yusuf et al. | |
| 2019/0041312 | A1* | 2/2019 | Hadar | B33Y 50/02 |
| 2020/0090314 | A1* | 3/2020 | Mayr | G06N 20/00 |
| 2020/0184494 | A1* | 6/2020 | Joseph | G06F 18/214 |

OTHER PUBLICATIONS

International Search Report and Written Opinion issued in corresponding International Application No. PCT/US2020/012684, dated Sep. 11, 2020, 11 pages.

\* cited by examiner

APPARATUS, SYSTEM AND METHOD FOR DEVELOPING INDUSTRIAL PROCESS SOLUTIONS USING ARTIFICIAL INTELLIGENCE

BACKGROUND

Field of the Disclosure

The present disclosure relates to industrial processes, and, more specifically, to an apparatus, system and method for industrial process solutions.

Description of the Background

Automated inspection of industrial assets on a large scale has historically required the significant use of advanced analytics, which itself necessitates highly expert programmers to do ad hoc, unstructured inspection programming. As such, automating an industrial inspection process requires: technical expertise and a multitude of machine learning techniques across multiple different types of machines; significant subject matter expertise in the particular inspection at issue; substantial technical know-how; access to large-scale data acquisition in multiple modalities; the acquisition of statistically significant representative data sets in order to train and analytics engine developed pursuant to the unstructured programming; identifying known Machine Learning (ML) models, the flaws in known models, and optimal KPI's for a given industrial setting; enabling iterative improvements to the analytics modeling without full-scale reprogramming; executing, training, testing, and validation sessions in parallel on multiple computing nodes, wherein each note may speak a different computing language, in a cloud based application; maintaining a separate storage at which an auditable history of the versions of the ML model resides in order to allow for reversion to previous model versions if necessary; enabling second order analytics on the history of previous model versions; and providing for a multitude of machine and data types and modalities, including but not limited to time series data, 2D RGB and IR data, 3D point cloud data, video data, image sequence data, and so on.

SUMMARY

The disclosure includes at least an apparatus, system and method of providing industrial analytics. The apparatus, system and method may include at least a plurality of sensors sensing performance indicators for an industrial process across multiple nodes, wherein ones of the multiple nodes are remote from each other; at least one machine learning module comprising non-transitory computing code executed by at least one processor. When executed by the processor, the code causes the steps of: receiving user input regarding at least the industrial process and a data set; selecting a model based on at least the user input, wherein the selected model comprises a plurality of learnings based on the performance indicators sensed by multiple ones of the plurality of sensors across at least multiple ones of the multiple nodes; applying the selected model to the data set; assessing at least the performance indicators for the data set upon application of the selected model; outputting the assessed performance indicator; and starting optimization of the model based upon assessed performance indicators.

The industrial process may comprise an industrial inspection. The industrial inspection may comprise inspection of solar cells or any other industrial asset for the purpose of detecting objects including object defects, anomalies, trends, comparative changes, part inventory, geometry and volumetry, making predictions, diagnostics, and/or conducting other quantitative and qualitative analyses. The user input may comprise a selection from a menu of a user interface provided by the non-transitory code. The user interface may comprise a Web interface or a mobile device interface, by way of example. The user interface may be a thin or thick client.

The data set may be live data, historical data, training data, or combinations thereof. The training data may at least partially comprise simulated data. The selected model may comprise an optimized model for the user input based on reiterations of the machine learnings. The optimization of the selected model may occur by comparison to acceptable outcome criteria within the user input, and/or by automatic development pursuant to the machine learnings. The acceptable outcome criteria may correspond uniquely to the industrial process.

BRIEF DESCRIPTION OF THE DRAWINGS

The disclosed non-limiting embodiments are discussed in relation to the drawings appended hereto and forming part hereof, wherein like numerals may indicate like elements, and in which.

DETAILED DESCRIPTION

Figure 1:
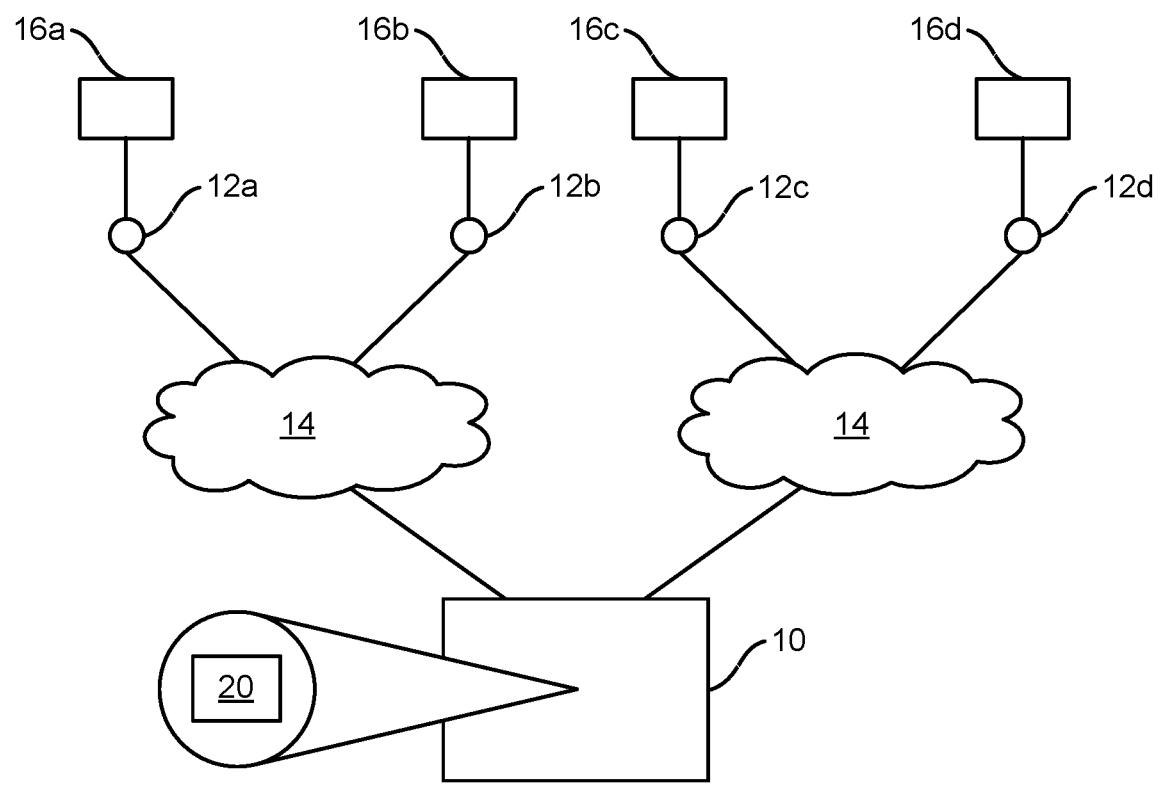
FIG. 1 is an illustration of access by an artificial intelligence analytics module across multiple nodes.

The figures and descriptions provided herein may have been simplified to illustrate aspects that are relevant for a clear understanding of the herein described apparatuses, systems, and methods, while eliminating, for the purpose of clarity and/or brevity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of clarity and/or brevity a discussion of such elements and operations may not be provided herein. However, the present disclosure is deemed to nevertheless include all such elements, variations, and modifications to the described aspects that would be known to those of ordinary skill in the art in light of the instant disclosure.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may thus be embodied in different forms. As such, the embodiments should not be construed to limit the scope of the disclosure.

The terminology used herein is for the purpose of describing the particular example embodiments set forth only and is not intended to be limiting. For example, as used herein, the singular forms "a", "an" and "the" may be intended to include the plural forms as well, unless the context clearly indicates otherwise. Further, the terms "comprises," "comprising," "including," and "having," are inclusive and therefore may indicate the presence of stated features, integers, steps, operations, elements, and/or components, and, in any event, do not preclude the presence or addition of one or more other features, integers, steps, operations, elements, components, and/or groups thereof.

Although the terms first, second, third, etc., may be used herein to describe various elements, components, steps, regions, layers and/or sections, these elements, components, steps, regions, layers and/or sections should not be deemed to be limited by these terms. These terms may be only used to distinguish one element, component, step, region, layer or section from another element, component, step, region, layer or section, unless an indication is given to the contrary. Thus, terms such as "first," "second," and other numerical terms when used herein do not imply a sequence or order unless explicitly stated or clearly indicated by the context. Thus, a first element, component, step, region, layer or section discussed below could be termed a second element, component, step, region, layer or section without departing from the teachings of the exemplary embodiments.

Correspondingly and notwithstanding the use of terms such as "first" or "second" in association therewith, it should be noted that the method steps, processes, and operations described herein are not to be construed as necessarily requiring their performance in the particular order discussed or illustrated, unless specifically identified as a necessary order of performance. It is also to be understood that additional or alternative steps may be employed.

Processor-implemented modules, engines, systems and methods of use are disclosed herein that may provide networked access to a plurality of types of digital content, including but not limited to video, image, text, audio, data, metadata, algorithms, interactive and document content, which may track, deliver, manipulate, transform and report the accessed digital content. Described embodiments of these modules, engines, systems and methods are intended to be exemplary and not limiting. As such, it is contemplated that the herein described apparatuses, systems and methods may be adapted and may be extended to provide enhancements and/or additions to the exemplary modules, engines, systems and methods described, and thus the disclosure is thus intended to include all such extensions.

It should also be understood that the terms "module" and "engine", as used herein, do not limit the functionality to particular physical modules, but may include any number of tangibly-embodied software and/or hardware components having a transformative effect on at least a portion of a disclosed system and its data. In general, a computer program product in accordance with software-related embodiments may comprise a tangible computer usable medium (e.g., standard RAM, ROM, EEPROM, an optical disc, a USB drive, or the like) having computer-readable program code embodied therein, wherein the computer-readable program code is adapted to be executed by a processor (which may work in connection with an operating system) to implement one or more systems, functions and methods as described herein. In this regard, the disclosed software may be implemented in any desired language, and may be implemented as machine code, assembly code, byte code, interpretable source code, or the like (e.g., via C, C++, C#, Java, Actionscript, Objective-C, Javascript, CSS, XML, etc.), unless noted otherwise and by way of non-limiting example.

The embodiments include at least a platform that includes a set of formalisms, tools, software and hardware to enable rapid development and production deployment of industrial processes, such as industrial asset inspection, in automated solutions available to personnel with no expertise in machine learning, industrial inspection or software engineering. The embodiments also provide a vastly shortened development cycle for development and deployment of such automated solutions.

More particularly, the disclosed apparatus, system, method and platform creates a formalism for packaging methods, features, algorithms, models, combinations, and sequences needed to solve an industrial process problem, such as an industrial inspection problem, using the most appropriate key performance indicators (KPIs), the most relevant historical solutions data, and relevant metadata. The foregoing are abstracted into models for a given application, such as an industrial inspection process, wherein the models may also include the model's success and/or use history, and wherein this history may enable restoration of a prior version or versions of a model. Data from the formalism may be packaged, such as along with the relevant metadata and/or historical model application data, any relevant acquired data in a "live" run, historical test and/or live data, and so on, into abstracted data sets. The abstracted data sets may be consumed by multiple models of the same type, e.g. a multitude of corrosion models might consume a given corrosion dataset, but the datasets might contain KPIs keyed uniquely to each model.

Thereby, industrial analytics may comprise a coupling of a given model with a given data set from an "a la carte" menu of sorts, wherein a catalog of relevant model and data set menus may be made available, such as by category in a user Web or mobile device interface, to a user from any local or remote location. Accordingly, a pairing of a model and a data set may be selected by a user in "live mode", i.e., live data may be selected for pairing with a given model, such as a recommended model for a given problem, or in a training mode wherein the outcome of the model and data set pairing may be tested on a sample data set prior to live execution of the given pairing, such as to ensure compatibility.

The aforementioned relevant data fed into a model by the disclosed platform may include remote execution of underlying operations, including cloud data storage, and/or retrieval and execution of code for and by a scalable cluster of graphics processing units (GPUs) and/or central processing units (CPUs) nodes. Relevant data may also enable an interfacing with applicable graphing programs, such that visual interpretation graphs of the model and data set pairing outcome(s) may be provided to expert and nonexpert users such that the merits of the application of the selected model to the problem in question, i.e., the merits of the model as applied to the selected data set, may be judged.

Thus, experts and nonexperts, and employees and customers, may all be enabled to create and improve effective and efficient analytics models to solve challenging industrial problems, such as industrial inspection problems, using a thin or thick client interface, even without significant subject matter expertise. The foregoing may be enabled, in part, by an artificially intelligent machine learning module, acting as the platform discussed throughout, in conjunction with cloud computing capability that applies continuously-learned subject matter expertise, in the form of ever-evolving solutions models categorized by problem(s) solved, across multiple geographic locations, and/or across multiple modes on a computing network.

More particularly, the disclosed artificially intelligent analytics module may "learn" from solution models applied, and problems assessed, across multiple nodes and to multiple data sets, to formulate "best solution" models for given problems and/or for given data set categories. In some embodiments, the data from some or all such multiple nodes may be anonymized, such that the disclosed cloud computing solution may access and learn from application of model(s) to private data that would be otherwise unavailable to the recipient of the modeled solution. That is, the disclosed artificially intelligent analytics module may learn from iterative application of models to a virtually unlimited "big data" set comprised of industrial solutions applied to relevant industrial data across a great many nodes. The module may thus also normalize the applied computing model and/or the data, as the model may be applied across many different machines and machine types across the many different nodes. The models thereby provided and applied to various different machines, machine types, and problem sets, and the adequacy of the solutions thus assessed may, upon machine learning by the AI (Artificial Intelligence) module, be tweaked or otherwise modified to provide a new and heretofore unknown model that best solves each given industrial problem across all the normalized data sets. The continuously modified model is thus a continuously improving model over all other then-existing solution models.

For example, FIG. 1 illustrates access by the artificial intelligence analytics module 10 across multiple nodes 12a, 12b, 12c, 12d . . . , some local and some remote, on a given network 14. As illustrated, ones of the nodes 12a, 12b . . . may comprise different classes of machine 16a, 16b . . . , wherein the machine classes 16a, 16b . . . at each node 12a, 12b . . . , and/or multiple machines at a single node, may each speak different machine languages. Nevertheless, the sensor data and/or machine data generated by the different classes 16a, 16b, and the consequent application of a single solution model or set of models in each different machine language, i.e., across each machine class 16a, 16b . . . may be discerned by the analytics module 10 into a unified set of globally applicable optimal solution model or models 20.

Further, the analytics module 10 may maintain the historical data, such as in a normalized manner, across each machine 16a, 16b . . . , and thus across each machine language and each machine class, as well as across each node 12a, 12b . . . , such that the best solution model or models developed by the analytics module 10 may be applied independently to the data sets generated by each machine 16a, 16b . . . This continuous application by the machine learning module 10 to various data sets allows for a continuous assessment of the propriety of the solution model uniquely for each machine type, machine language, node, or particular problem.

Figure 2:
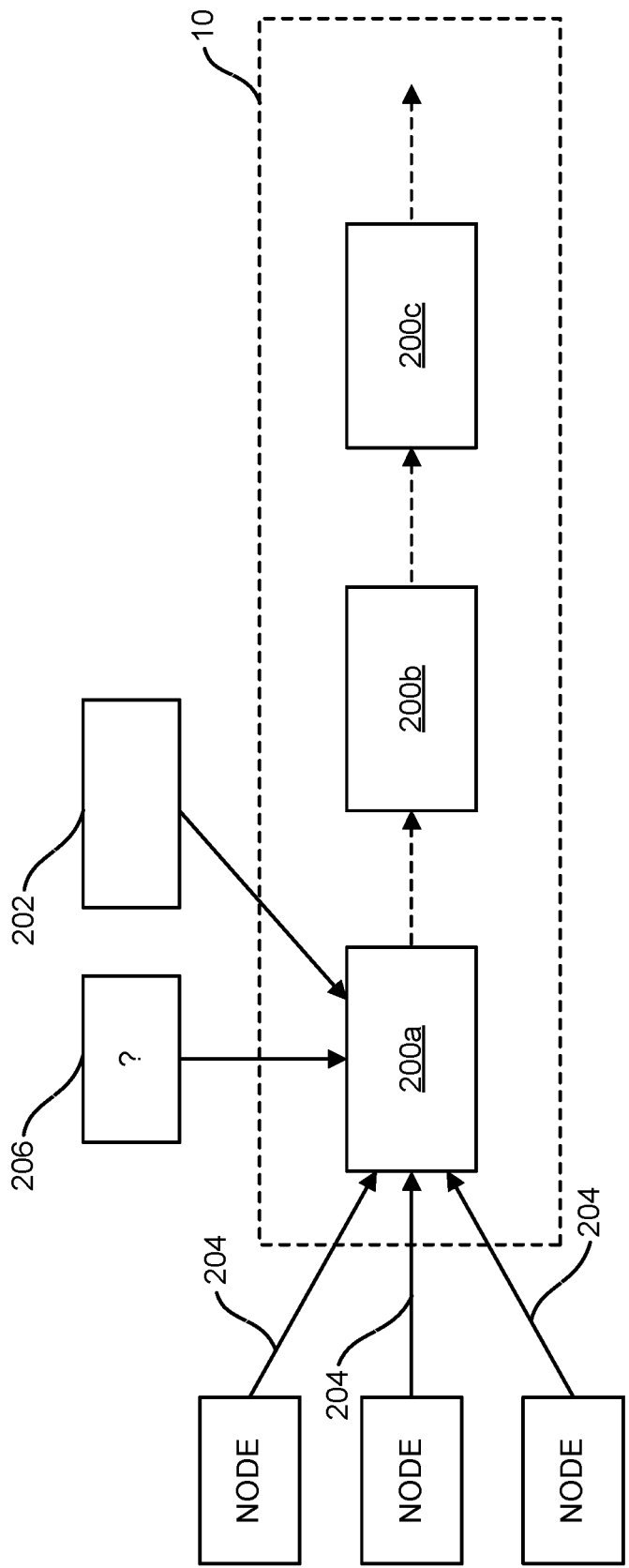
FIG. 2 is an illustration of an end-to-end industrial process analytics system applying acceptable outcome criteria.

That is, and as illustrated in FIG. 2, the embodiments may provide an end-to-end model 200 or models that is automatically generated by applying optimized acceptable outcome criteria 202 based on a unique problem or problem set 206, i.e., a unique issue, node, machine type, machine language, etc. The data accumulated across multiple nodes 204 may be paired with a selected model 200 by being fed into that model 200, and the model may be subjected to an assessment of whether or not it meets the optimized acceptable outcome criteria 202 for all, one, or a predetermined number of the nodes, and/or data sets or data types, to which it is applied. If not, the AI module 10 may generate a new model 200b or modify the prior model 200a, wherein the new or modified model includes learnings from the failings of the prior model 200 for a given use-case/problem set 206, and the AI module 10 may then feed the prior data anew into the new/updated model 200a, 200b to assess whether or not the new model 200a, 200b now meets the acceptability criteria 202. Of note, acceptability criteria 202 may be entered into the AI module 10, or the acceptability criteria 202 may be automatically generated by the AI module 10 based on learnings from the failings of other models at various nodes throughout the network to cure the problems 206 suggested by the data at each node.

As such, models may be entered into the AI module, or automatically generated by the AI module, based on multi-node, multi-machine data sets—that is, multiple sensor outputs and/or machine data sets not only across multiple nodes and multiple machines, but even, in some instances, across multiple industries. That is, multiple industries may suffer from the same problems with particular machines, regardless of the output function provided by each particular machine for the distinct industrial process in which it is applied for a unique use case. As such, the model and data pairings may be normalized, as discussed throughout, not only by machine type, machine language, or solution sought, but also by industry type, product produced, industrial vertical, and so on.

The normalization by the AI module, as discussed throughout, also allows for the disclosed user interactions and sought solutions to be readily available via Web based applications, mobile based applications, cloud based applications, or the like. Accordingly, the embodiments may operate at one or more hardware, firmware, and software abstraction levels, such as those levels of the Open Systems Interconnection (OSI) model. For example, the AI module may operate an instruction level, wherein machine learning and artificial intelligence are performed on existing data. Alternatively, lower-level modeling and normalization may be provided, such as to readily allow interaction with any of various known machine types and languages. Further, embodiments may operate at a base data level, such as wherein data is categorically stored, such as in categories including sensor output data, performance video data, yield data, and so on, such that any of various data sets evidencing any of various issues may be selected and paired with a given manually generated or automatically generated solution model so as to allow for optimization testing of the model on existing data. In another embodiment, continuous learning is automated such that no manual interaction is needed, and, in such a case, providing a new dataset to the system may automatically trigger the learning process.

Needless to say, the manual interfacing by the user that is discussed throughout may occur via any known user interface type, and may preferably be designed so as not to require particular expertise in model generation. For example, a user interface may employ drag and drop capabilities, hierarchical or tree menus, windowed file selection, and the like to allow a user to readily search for desired models and data, and to readily pair models with data for live execution or test runs. Moreover, the user interface may allow for the user to input optimization criteria as discussed throughout, may suggest to the user proper optimization criteria, or may automatically generate and update optimization criteria based on application of models across multiple nodes. That is, the embodiments may be inside entirely self-contained, but with access to external data across many nodes and machines, such that the AI module discussed throughout may continuously learn in order to generate and update models to meet any given criteria, or to meet organically discerned criteria generated by the AI module itself.

By way of non-limiting example in the field of solar panels, a hierarchy of successive machine learning models may be developed and deployed. For example, a first, basic level model may allow for enhanced detection of bumps on inspection images of solar cells, or may accumulate bump data as input by a manual or automated inspector. A second model may be applied to detect performance of the solar cells, such as in a pairing with the first model, such that the effect of bumps of particular shapes and sizes may be assessed as a determining factor of solar cell performance.

An initial theory of the effect of bumps on solar cell performance, and/or of the best manner to detect bumps that will affect performance, may be input as the first and/or second model referenced above, such as to then be subjected to experimentation across large quantities of data and across multiple tests nodes. This initial theory may be input to the AI module through the user interface, or may be automatically generated by the AI module based on prior applications in the same or parallel industries, such that the initial theory may be tweaked by the AI module as it applies the base theory to data sets to generate the first and/or second model, and thereafter application of the tweaked model may be repeated one or multiple additional times. That is, the first and the second model in this example may be self-contained and manually or automatically tweaked, or may be modified based on multi node and/or multi sensor data in the field.

Thereafter, yet a third model may be employed in application to solar panels having thereon the solar cells previously tested and/or otherwise (such as by simulation in the AI module) subjected to the continuously updated first and second models. Consequently, a global model to optimize performance of a solar panel based on the characteristics of the solar cells therein may be subjected to multiple sensor test data across multiple nodes, such that this global model may be tweaked, including in each of sub-models one, two and three discussed above, in order to gain a desired optimization of a solar panel based on input acceptability criteria. The desired optimization may constitute the acceptability criteria discussed throughout, and as such may be an optimized performance of solar panels, or an optimized yield for output solar panels meeting a minimum threshold, by way of non-limiting example, which acceptability criteria may ultimately be based on factors too numerous and complex to be balanced without the model and sub-models of the AI module, such as based on the bumps in the solar cells, uniformity in performance of solar cells in a panel, and so on.

Figure 3A:
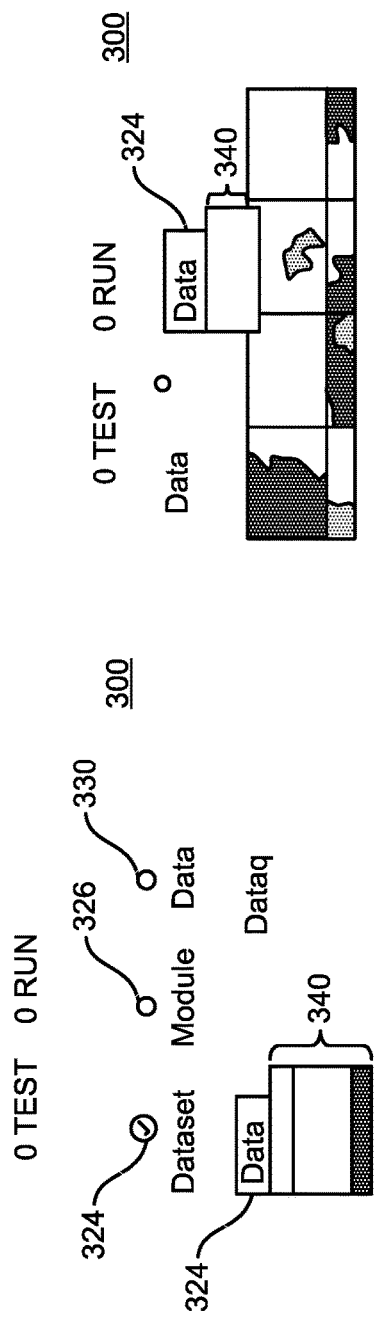
FIGS. 3A-F are illustrations of a user interface.
Figure 3B:
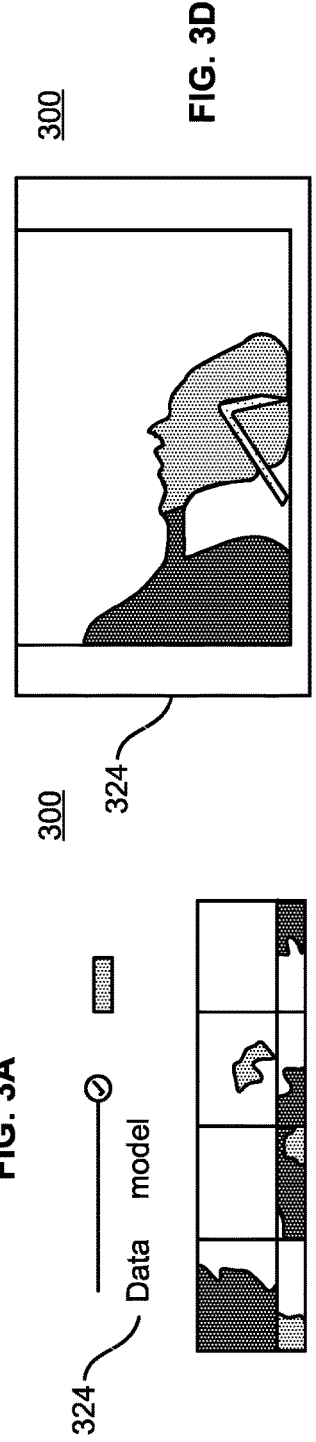
Figure 3C:
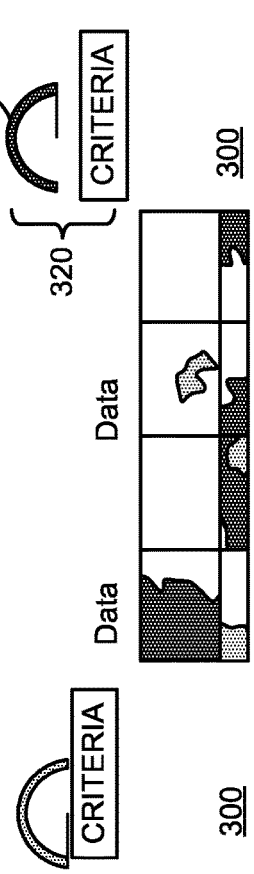
Figure 3D:
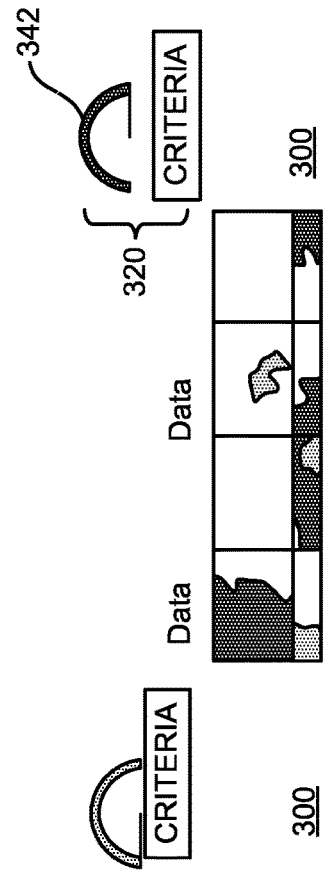

More particularly, and as illustrated in FIGS. 3A-F, user interface 300 may provide a simplistic process of user interaction to arrive at a best suited model for a given application, and in light of acceptability criteria 320 (as illustrated in FIG. 3A) As shown in FIG. 3B, the user may first select whether to input a model for testing, train a model for a given application, or apply a model in a live setting to a given application. Accordingly, the user may first select a data set 324, that shows an image data set and a random image visualized with the option to scroll and preview other images, such as a pre-existing data set for the user's node, a pre-existing data set across multiple other nodes, or a live data set being actively generated. Thereafter, the user may be enabled to select a model 340 (as illustrated in FIGS. 3C and 3D), such as a model uploaded by the user, previously employed by the user, most frequently employed by other users for similar applications, or a model generated by the AI module.

Figure 3E:
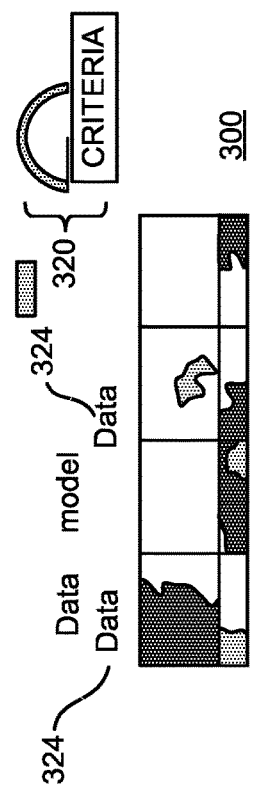

In some instances, a match 330 between the selected model 340 and the selected data set 324 (as illustrated in FIG. 3E) may be initially assessed, such as given the context selected by the user. For example, selected pre-stored multi-node data in a given context may be assessed for suitability to a user's own independent uploaded model. However, in other circumstances, such as wherein the user attempts to upload a model and apply the model to live data, the AI module may assess a mismatch, such as by alerting a user that, if the model is deemed likely unsuitable to gain the given acceptability criteria, the users process may fail with dire consequences if the model is applied to live data.

Other aspects may be available to the user via user interface 300, such as allowing the user to assess the propriety of the data set to which a selected model is to be applied. For example, the user may be enabled to search or browse a data set in order to visualize that data to which the users selected model will be applied 340.

Figure 3F:
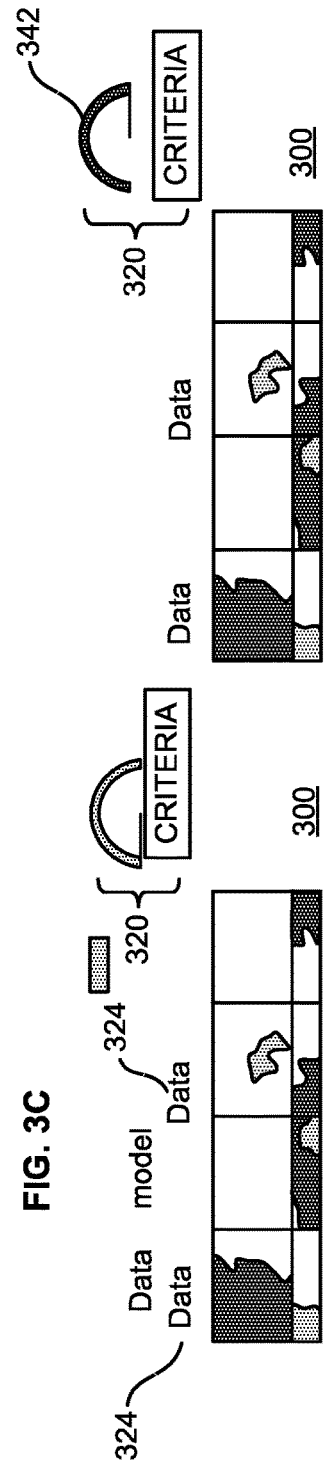

As shown and referenced above, the user may select one of multiple different contexts for the selected model and data set, such as to train a model initially uploaded by a user. In the illustration of FIG. 3F, the user may begin the process of training the model by applying the model to the data approved by the user, and thereafter may receive output 342 indicating the propriety of the model given the user's selected acceptability criteria 320. In the example shown, the application of the model to the approved data set meets the users' acceptability criteria 320 at the 90% threshold.

Figure 4A:
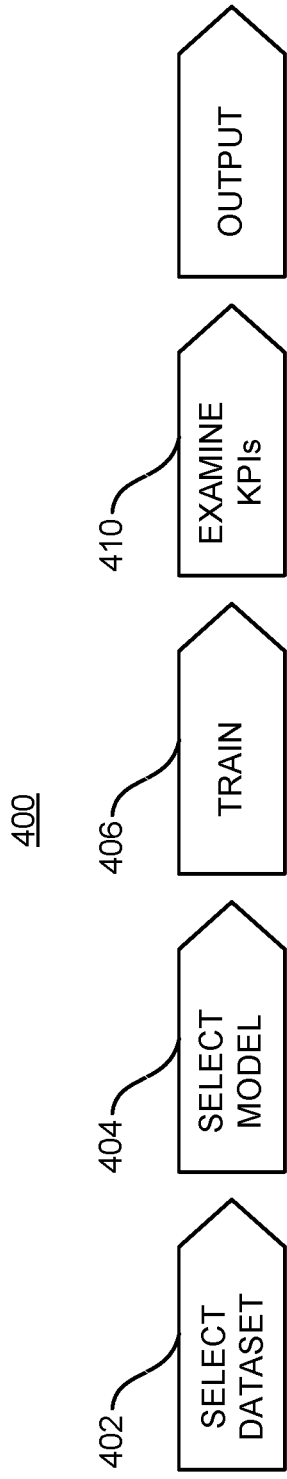
FIG. 4 are illustrations of workflows performed by the disclosed analytics module.
Figure 4B:
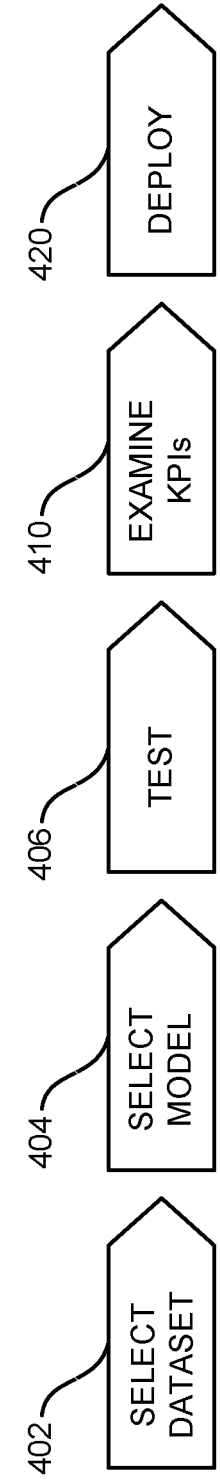

FIGS. 4A and 4B illustrate training and testing work flows 400 of which the disclosed AI module is capable. In the illustration of FIG. 4A, a selected data set 402 and selected model 404 are combined 406 by the AI module in order to train the model. That is, the model is applied to the data set, and thereafter the AI module analyzes key performance indicators (KPIs) 410 in order to assess whether the selected model is proper, improper, or needs to be updated, such as before application to live data to solve an issue to an acceptability criteria threshold. Similarly, FIG. 4B illustrates the combination 406 of a model 402 and data set 404, the examination of key performance indicators 410 of the selected combination 406, and the ability to deploy 420 the model into a user's process to the extent the key performance indicators show that the acceptability criteria of the user has been met, such as within a given threshold. It should be noted that acceptability criteria (KPIs) 410 and datasets 402 for the training and deployment work flows of FIG. 4A and FIG. 4B may differ, even if the same model 404 is referenced. The work flows may be cyclical by nature, i.e. if the acceptability criteria aren't met, the model refinement (i.e., "tweaking") may continue by using the described procedures herein.

Figure 5:
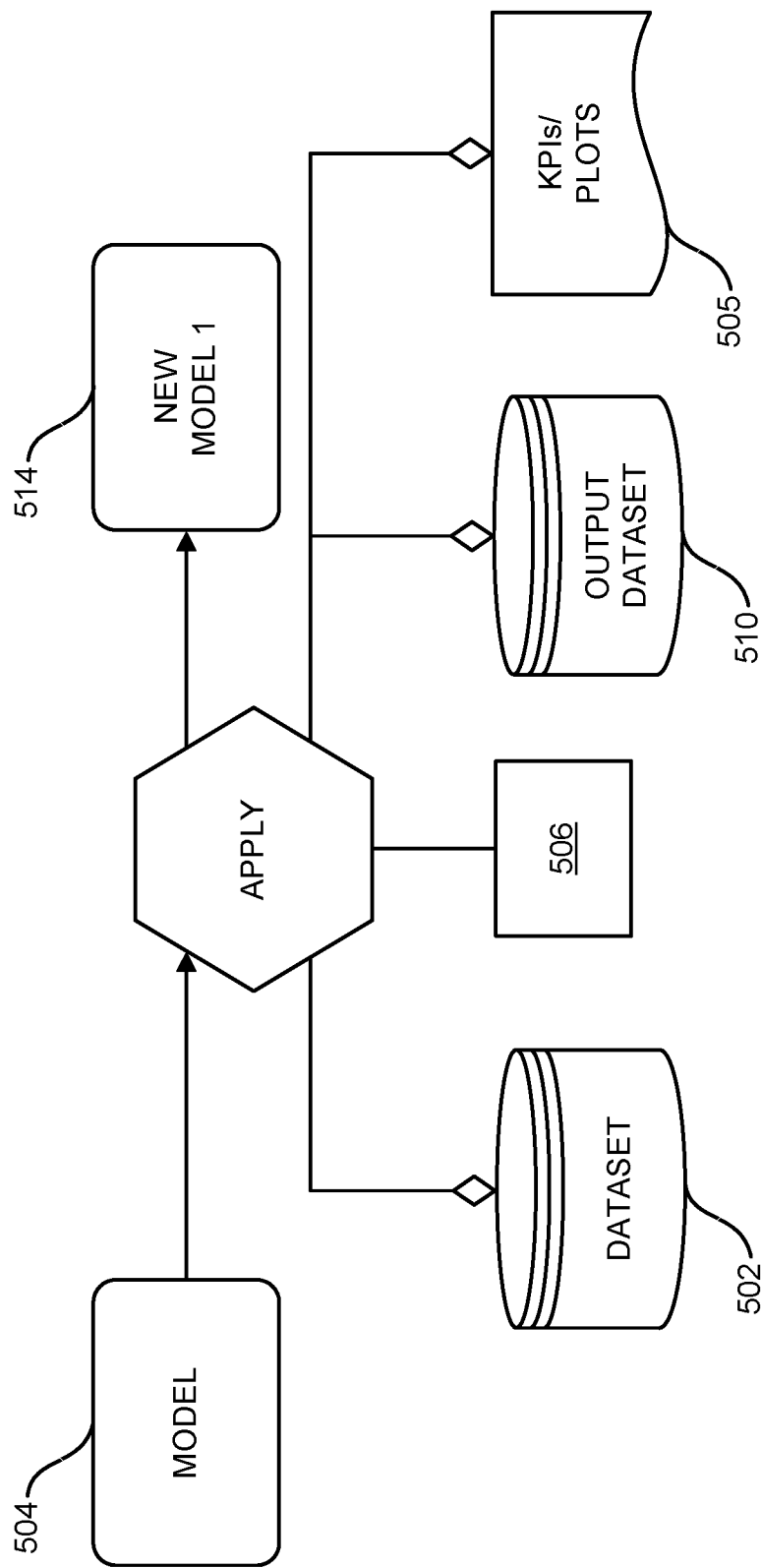
FIG. 5 illustrates the oversight by an analytics module of the updating to an input or selected model.

FIG. 5 illustrates the oversight by the AI module of the updating to an input or selected model as discussed above with respect to FIG. 4A. Moreover and as shown, a data set may be selected 502, either by the user or the AI module as discussed herein, as may be a particular model 504 for a given context. The AI module 506 may then apply the selected model 504 to the selected data set 502, may generate output 510 therefrom, in which the key performance indicators 505 of this model 504 applied to this data 502 may be analyzed 512, such as automatically by the AI module and/or manually by providing the key performance indicators to the user interface discussed throughout. Based on the indication of KPIs, or, more particularly, whether the acceptability criteria is met, the AI module may select or allow for selection an updated model, or a new model altogether 514.

Figure 6:
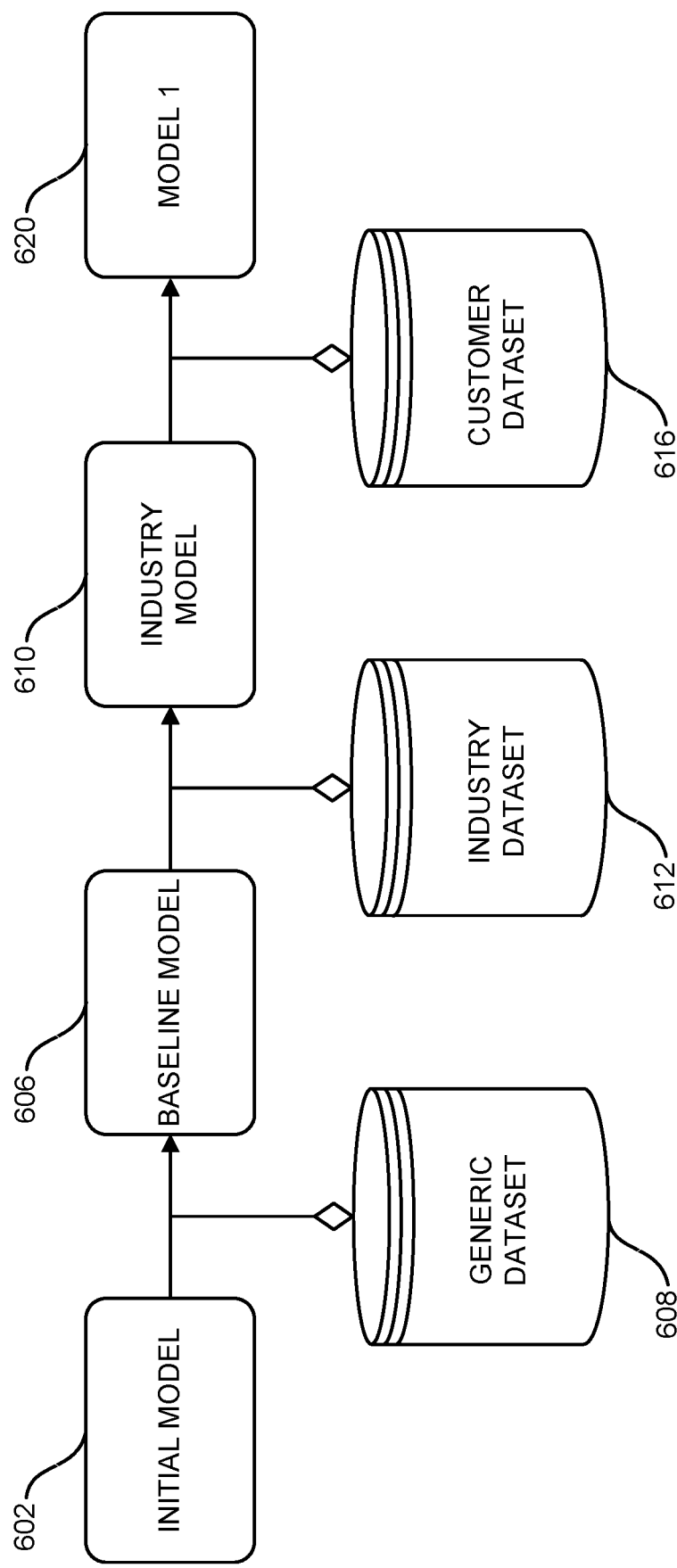
FIG. 6 illustrates the series development of a model.

Accordingly, and as illustrated in FIG. 6, one or more initial models may be selected 602, such as by the user and/or by the AI module. These models may be delineated as a master model with sub-models, by way of non-limiting example. Each such model and or sub-model may have a particular data set applied thereto to assess the propriety of a given process solution at each stage of model development. For example, initial data sets applied to a baseline applicable model 606 may be generic data sets 608, such as the historical multi-node anonymized data discussed throughout; data may be specific to a given industry, or a given vertical 612, and may be applied to develop the baseline model 606 into an industry specific module 610 for a machine type or industrial process within a specific industry, for example; and/or "live" or historic data 616 of the user may be input or selected by a user to refine the model specifically for that user 620. Needless to say, the AI module may vary application of a model or sub-models based on the source of the data provided to the AI module.

Figure 7:
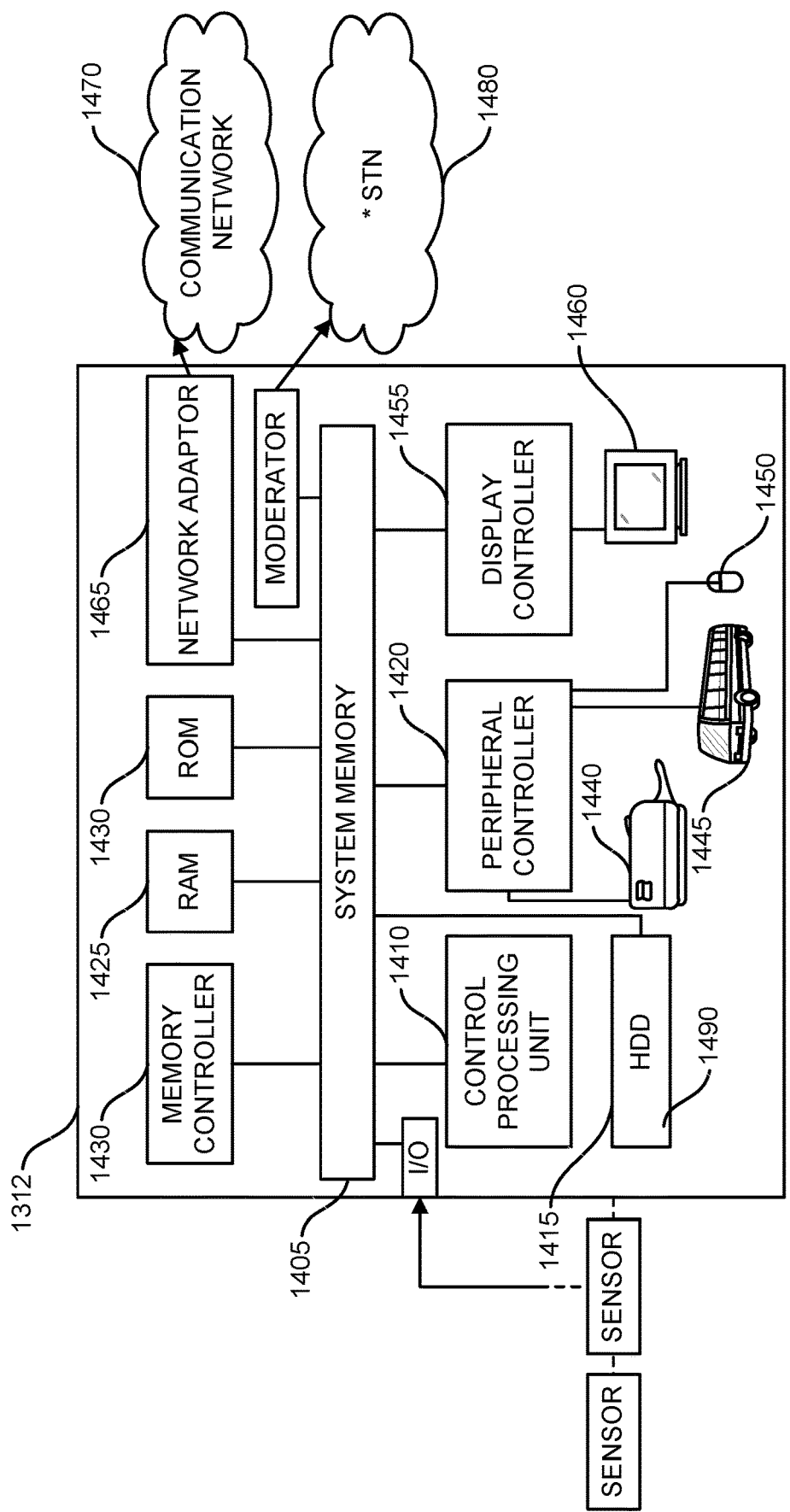
FIG. 7 depicts an exemplary computer processing system.

FIG. 7 depicts an exemplary computer processing system 1312 for use in association with the embodiments, by way of non-limiting example. Processing system 1312 is capable of executing software, such as an operating system (OS), applications, user interface, and/or one or more other computing algorithms/applications 1490, such as the recipes, models, modules, engines programs and subprograms discussed herein. The operation of exemplary processing system 1312 is controlled primarily by these computer readable instructions/code 1490, such as instructions stored in a computer readable storage medium, such as hard disk drive (HDD) 1415, optical disk (not shown) such as a CD or DVD, solid state drive (not shown) such as a USB "thumb drive," or the like. Such instructions may be executed within central processing unit (CPU) 1410 or GPU to cause system 1312 to perform the disclosed operations, comparisons and calculations. In many known computer servers, workstations, personal computers, and the like, CPU 1410 or GPU is implemented in an integrated circuit called a processor.

It is appreciated that, although exemplary processing system 1312 is shown to comprise a single CPU 1410, such description is merely illustrative, as processing system 1312 may comprise a plurality of CPUs 1410. Additionally, system 1312 may exploit the resources of remote CPUs (not shown) (or GPUs) through communications network 1470 or some other data communications means 1480, as discussed throughout.

In operation, CPU 1410 fetches, decodes, and executes instructions from a computer readable storage medium, such as HDD 1415. Such instructions may be included in software 1490. Information, such as computer instructions and other computer readable data, is transferred between components of system 1312 via the system's main data-transfer path. The main data-transfer path may use a system bus architecture 1405, although other computer architectures (not shown) can be used.

Memory devices coupled to system bus 1405 may include random access memory (RAM) 1425 and/or read only memory (ROM) 1430, by way of example. Such memories include circuitry that allows information to be stored and retrieved. ROMs 1430 generally contain stored data that cannot be modified. Data stored in RAM 1425 can be read or changed by CPU 1410 or other hardware devices. Access to RAM 1425 and/or ROM 1430 may be controlled by memory controller 1420.

In addition, processing system 1312 may contain peripheral communications controller and bus 1435, which is responsible for communicating instructions from CPU 1410 to, and/or receiving data from, peripherals, such as peripherals 1440, 1445, and 1450, which may include printers, keyboards, and/or the operator interaction elements on a mobile device as discussed herein throughout. An example of a peripheral bus is the Peripheral Component Interconnect (PCI) bus that is well known in the pertinent art.

Operator display 1460, which is controlled by display controller 1455, may be used to display visual output and/or presentation data generated by or at the request of processing system 1312, such as responsive to operation of the aforementioned computing programs/applications 1490. Such visual output may include text, graphics, animated graphics, and/or video, for example. Display 1460 may be implemented with a CRT-based video display, an LCD or LED-based display, a gas plasma-based flat-panel display, a touch-panel display, or the like. Display controller 1455 includes electronic components required to generate a video signal that is sent to display 1460.

Further, processing system 1312 may contain network adapter 1465 which may be used to couple to external communication network 1470, which may include or provide access to the Internet, an intranet, an extranet, or the like. Communications network 1470 may provide access for processing system 1312 with means of communicating and transferring software and information electronically. Additionally, communications network 1470 may provide for distributed processing, which involves several computers and the sharing of workloads or cooperative efforts in performing a task, as discussed above. Network adaptor 1465 may communicate to and from network 1470 using any available wired or wireless technologies. Such technologies may include, by way of non-limiting example, cellular, Wi-Fi, Bluetooth, infrared, or the like.

Modules, data structures, and the like are defined and explained herein for ease of discussion, and are thus not intended to imply that any specific implementation details are required. For example, any of the described modules and/or data structures may be combined or divided into sub-modules, sub-processes or other units of computer code or data as may be required by a particular design or implementation. Moreover, it is appreciated that exemplary computing systems as described herein are merely illustrative of computing environments in which the herein described systems and methods may operate, and thus does not limit the implementation of the herein described systems and methods from computing environments having differing components and configurations. That is to say, the concepts described herein may be implemented in various computing environments using various components and configurations.

In the description herein, numerous specific details, examples, and scenarios are set forth in order to provide a more thorough understanding of the disclosure. It will be appreciated by the skilled artisan, however, that embodiments of the disclosure may be practiced without such specific details. Further, such examples and scenarios are provided for illustration, and are not intended to limit the disclosure in any way.

For example, references in the specification to "an embodiment" indicate that the embodiment described may include a particular feature, structure, or characteristic, but it should be understood that every embodiment stemming from the disclosure, whether or not described herein, may not necessarily include the particular feature, structure, or characteristic. Moreover, it should be appreciated that reference to an "embodiment" throughout is not necessarily referring to the same embodiment.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and it will thus be evident that any generic principles defined herein may be applied to other variations without departing from the spirit or scope of the disclosure. Thus, the disclosure is not intended to be limited to the examples described herein, but rather is to be accorded the widest scope consistent with the principles and novel features disclosed herein.

What is claimed is:

1. An industrial analytics system, comprising:
a plurality of sensors sensing performance indicators for an industrial process across a plurality of nodes, each of the plurality of nodes comprising one or more industrial machines, wherein the plurality of sensors are coupled to the nodes and two or more of the plurality of nodes are remote from each other;
at least one machine learning module comprising non-transitory computing code executed by at least one processor which, when executed, causes the steps of:
receiving user input regarding at least the industrial process and a data set;
selecting a model based on at least the user input, wherein the model comprises a plurality of learnings based on the performance indicators sensed by at least a portion of the plurality of sensors across at least a portion of the plurality of nodes;
applying the model to the data set;
assessing a uniformity of the performance indicators for the data set upon application of the model;
outputting the uniformity of the performance indicator; and
optimizing a selection of a subsequent model comprising the plurality of learnings by using the uniformity of the performance indicator to minimize a variation of the performance indicators for the data set such that the selected subsequent model generates a minimized variation of the performance indicators.

2. The industrial analytics system of claim 1, wherein the industrial process comprises an industrial inspection.

3. The industrial analytics system of claim 2, wherein the industrial inspection comprises inspection of solar cells.

4. The industrial analytics system of claim 1, wherein the user input comprises a selection from a menu of a user interface provided by the non-transitory computing code.

5. The industrial analytics system of claim 4, wherein selecting the model comprises selection in the user interface.

6. The industrial analytics system of claim 4, wherein the user input comprises selecting solely the industrial process and the data set at the user interface, and wherein the selecting the model comprises an automated selection based on the machine learnings regarding the input industrial process.

7. The industrial analytics system of claim 4, wherein the user interface comprises a Web interface.

8. The industrial analytics system of claim 4, wherein the user interface comprises a mobile device interface.

9. The industrial analytics system of claim 4, wherein the user interface is a thin client.

10. The industrial analytics system of claim 1, wherein the data set is live data.

11. The industrial analytics system of claim 1, wherein the data set is training data.

12. The industrial analytics system of claim 11, wherein the training data at least partially comprises simulated data.

13. The industrial analytics system of claim 1, wherein the data set is historical data.

14. The industrial analytics system of claim 1, wherein the model comprises a model for the user input based on reiterations of the machine learnings.

15. The industrial analytics system of claim 14, further comprising the non-transitory computing code performing an optimization of the model by comparison to acceptable outcome criteria within the user input.

16. The industrial analytics system of claim 15, wherein the acceptable outcome criteria corresponds uniquely to the industrial process.

17. The industrial analytics system of claim 15, wherein the acceptable outcome criteria are developed automatically responsive to the machine learnings.

18. The industrial analytics system of claim 1, wherein the performance indicators sensed by the portion of the plurality of sensors across the portion of the plurality of nodes are anonymized.

19. The industrial analytics system of claim 1, wherein the performance indicators sensed by the portion of the plurality of sensors across the portion of the plurality of nodes are normalized across different machine types.

20. The industrial analytics system of claim 1, wherein the machine learnings comprise at least failings of other models.

* * * * *